United States Patent [19]

Nagasaku et al.

[11] Patent Number: 5,649,725
[45] Date of Patent: Jul. 22, 1997

[54] THREAD JOINT FOR TUBE

[75] Inventors: Shigeo Nagasaku; Kenichi Ohyabu; Jun Maeda; Akira Narita, all of Osaka, Japan

[73] Assignee: Sumitomo Metal Industries Limited, Osaka, Japan

[21] Appl. No.: 544,137

[22] Filed: Oct. 17, 1995

[30] Foreign Application Priority Data

Oct. 19, 1994 [JP] Japan .................. 6-281184
Nov. 4, 1994 [JP] Japan .................. 6-295933

[51] Int. Cl.⁶ ............................ F16L 25/00
[52] U.S. Cl. .............. 285/334; 285/355; 285/334.4
[58] Field of Search ............... 285/333, 334, 285/334.4, 390, 355

[56] References Cited

U.S. PATENT DOCUMENTS

| | | | |
|---|---|---|---|
| 3,359,013 | 12/1967 | Knox et al. | 285/334 |
| 3,856,337 | 12/1974 | Ehm et al. | 285/334.4 |
| 4,153,283 | 5/1979 | Hellmund et al. | 285/334 |
| 4,384,737 | 5/1983 | Reusser | 285/334 |
| 4,619,472 | 10/1986 | Kozono et al. | 285/334 |
| 4,623,173 | 11/1986 | Handa et al. | 285/334 |
| 4,736,962 | 4/1988 | Mott et al. | 285/333 |
| 4,795,200 | 1/1989 | Tung | 285/334 |
| 4,958,862 | 9/1990 | Cappelli et al. | 285/334 |
| 4,984,829 | 1/1991 | Saigo et al. | 281/334 |
| 5,137,310 | 8/1992 | Noel et al. | 285/333 |
| 5,423,579 | 6/1995 | Blose et al. | 285/334 |

FOREIGN PATENT DOCUMENTS

| | | | |
|---|---|---|---|
| 2134274 | 8/1972 | Germany | 285/334 |
| 60-121385 | 6/1985 | Japan . | |
| 61-286688 | 12/1986 | Japan . | |
| 61-286689 | 12/1986 | Japan . | |
| 62-209291 | 9/1987 | Japan . | |
| 63-111388 | 5/1988 | Japan . | |
| 6-89863 | 11/1994 | Japan . | |
| 7510249 | 3/1977 | Netherlands | 285/334 |
| 1220856 | 1/1971 | United Kingdom | 285/334 |

Primary Examiner—Eric K. Nicholson
Attorney, Agent, or Firm—Burns, Doane, Swecker & Mathis, LLP

[57] ABSTRACT

A thread joint for a tube which suppresses galling without deteriorating its sealing performance since a sliding distance $L_S$ which expresses a quantity of spiral sliding of sealing portions relative to each other during a tightening period from the start of a contact between the sealing portions until shoulder portions abut each other satisfies the following relationship:

Sliding Distance $L_S \leq -0.0093 \times$ (Tube Outer Diameter)$^2$ + $4.73 \times$ (Tube Outer Diameter).

To shorten the sliding distance $L_S$, the sealing portion of a box portion is formed shorter than the sealing portion of a pin portion. In this case, a circumferential groove may be formed to discharge a dope. Conversely, the sealing portion of the pin portion is formed shorter than the sealing portion of the box portion. In this case, a precedent-stage unthread portion whose inclination is smaller than that of the sealing portion of the pin portion is formed between a male thread and the sealing portion of the pin portion. In addition, tapers of the sealing portions of the pin portion and the box portion are set at 1/6 or larger, and/or, a distance where the sealing portion of the box portion (pin portion) is formed so as to contact a curve which is tangent to the sealing portion of the pin portion (box portion) is 1.45 mm or larger.

38 Claims, 11 Drawing Sheets

$S = D_{PX} - D_{BX}$ $L'_A = (D_A - D_B)T_S$

THREAD JOINT FOR TUBE

BACKGROUND OF THE INVENTION

1. Field of the Invention

The present invention is related to a thread joint for connecting tubes which are used for test excavation, production or the like of oil and natural gas, and particularly, to a thread joint of a surface-sealing type.

2. Description of Related Art

In general, a round thread joint and a buttress thread joint of API standard are used as a thread joint for connecting oil country tubular goods. However, since oil wells and gas wells are becoming deeper and deeper these years, thereby making excavation conditions severer, a thread joint is exposed to a large three-dimensional load and subjected to a severe stress. In a production well, in particular, where the joint is subjected to a stress of a circumferential direction from within tubes, the joint must remain air-tight under a 3-axial stress.

A round thread joint and a buttress thread joint do not sufficiently meet such demand. A surface-sealing type thread joint which includes a metal sealing surface was developed for this reason, and use of surface-sealing type thread joints has already begun in a number of wells. A structure of a surface-sealing type thread joint will now be described, referring to FIGS. 1A, 1B, 2A and 2B.

FIG. 1A is a partial broken view showing a connection part of oil country tubular goods, and FIG. 1B is an enlarged view of this portion. Tubes P and P are connected to each other by a coupling C. Each tube P includes a pin portion 10 at an end which is to be inserted into the coupling C. The coupling C includes a box portion 20 for receiving the pin portion 10. A thread joint binds the pin portion 10 and the box portion 20 by screwing.

The surface-sealing type thread joint includes a male thread 11, which tapers toward a tip with an increasingly smaller diameter, on an outer periphery. A sealing portion 12 which tapers toward a tip with an increasingly smaller diameter is formed on the tip of the male thread 11. The tip of the pin portion 10 is a shoulder portion 13 which is a partial reverse conic surface having a reverse angle with respect to a cross section which is perpendicular to an axis of the tube. On the other hand, the box portion 20 internally includes a female thread 21 which corresponds to the male thread 11. A sealing portion 22 which correspond to the sealing portion 12 is formed at a back part of the box portion 20, and at a further back part of the box portion 20, a shoulder portion 23 which corresponds to the shoulder portion 13 is formed.

When the male thread 11 is screwed into the female thread 21, the sealing portions 12 and 22 contact each other. Since this allows the shoulder portions 13 and 23 to abut each other, the pin portion 10 and the box portion 20 are sealed face to face. To generate a sufficiently large surface pressure at the sealing surfaces, a diameter difference called an interference is supplied between the sealing portion 12 of the pin side and the sealing portion 22 of the box side.

The interference S is expressed by:

$$S = D_{PX} - D_{BX}$$

$D_{PX}$: the diameter of an apex of the pin side sealing portion (apex point)

$P_{BX}$: the diameter of an apex of the box side sealing portion (apex point)

Therefore, $S>0$, that is, $D_{PX}>D_{BX}$. Since the interference is supplied, the sealing portions 12 and 22 start interfering each other during screwing-in (FIG. 2A). Binding completes upon abutment of the shoulder portions 13 and 23 (FIG. 2B). A stroke of an axial direction from the beginning of the interference between the sealing portions 12 and 22 until the end of the binding is referred to here as a screwing-in quantity MOS ("make-up on seal").

In such a thread joint of the metallic surface-sealing type for a tube, due to the diameter difference between the sealing portions 12 and 22, during a period from the beginning of the interference between the sealing portions 12 and 22 until the end of the binding, i.e., while screwing-in of the make-up on seal quantity MOS is executed, the sealing portions 12 and 22 slide in a spiral direction while maintaining a high surface pressure. Hence, galling is likely to be created at the sealing portions 12 and 22. When galling is generated, the sealing surfaces become rough, whereby a clearance or excessive interference is created locally and the sealing performance is deteriorated.

In a joint which is used for oil country tubular goods of a casing size which has a relatively large diameter, in particular, galling is likely to be created since a distance $L_S$ that the sealing portions 12 and 22 slide (i.e., a distance that the sealing portions 12 and 22 move with friction with each other in a spiral direction) is long and a contact surface pressure P is large. If a tube is made of stainless steel which is alloy metal of nickel, chrome and etc., or is made of pure titanium or a titanium alloy, since the heat conductivity ratio is lower than that of a steel tube and a large quantity of heat is accumulated at sliding portions, galling is often created even in a tube which is of a tubing size which is a small-size.

Japanese Patent Application Laid-Open No. 60-121385 (1985) discloses a tube joint on which an Fe plating layer and a chemical synthesis film including phosphoric acid are formed in order to prevent galling at a thread surface.

Meanwhile, Japanese Patent Application Laid-Open No. 61-286688 (1986) discloses a tube joint which satisfies the relationship:

$$L \geq (D-d) \tan \gamma$$

where

L: Taper Extending Size

D: Minimum Outer Diameter Of Pin d: Maximum Inner Diameter Of Tapering Portion Of Box γ: Inclination Angle Of Tapering Portion Of Box and therefore which avoids contact at terminal surfaces. Japanese Patent Application Laid-Open No. 61-286689 (1986) discloses a tube joint which satisfies the relationship:

$$R = (m-m_1)^2/2(t-t_1)$$

where

R: Radius of Curvature of Tip Portion Of Pin m: Total Length of Tapering Outer Peripheral Surface $m_1$: Effective Sealing Length Of Tapering Outer Peripheral Surface t: Minimum Thickness Of Tapering Outer Peripheral Surface $t_1$: Thickness of Ring-Shaped End Surface and therefore in which the diameter of a tip portion of a pin becomes smaller moderately when tightened by a machine and therefore galling which is created due to concentration of a tightening stress is prevented.

Japanese Patent Application Laid-Open No. 62-209291 (1987) discloses a tube thread joint which improves a galling resistance by further reducing a contact surface pressure. Japanese Patent Application Laid-Open No. 63-111388 (1988) discloses a tube thread joint in which two slope portions are formed on the pin side so that end portions do not contact each other when the end portion is inserted.

Japanese Patent Application Publication No. 6-89863 (1994) discloses a tube thread joint in which a guiding surface 42 is formed in parallel to a bottom portion of a thread between a sealing surface 48 and a thread 40 and an inclination of the sealing surface 48 is larger than this, as shown in FIG. 3, so that a damage on surfaces upon engagement of the surfaces is prevented and a dope pressure is reduced.

SUMMARY OF THE INVENTION

The present invention has been made to solve such problems. Accordingly, a principal object of the present invention is to provide for a surface-sealing type thread joint for a tube which suppresses galling at a sealing surface without deteriorating the sealing performance.

A research conducted on galling by the inventors of the present invention to prevent galling at a sealing surface clarified the following facts.

1) In a thread joint of the surface-sealing type for a tube which includes a tapering metal sealing surface as shown in FIGS. 1A, 1B, 2A and 2B, due to the diameter difference between the sealing portions 12 and 22, a tip 12a of the sealing portion 12 of the pin side bumps against an entrance 22a of the sealing portion 22 of the box side when the tubes are screwed in and linked to each other, and hence, scratch is likely to be created at this portion. If screwing-in is further continued, galling is created at the sealing portions 12 and 22 from the scratch. As to drill tubes, tubes are discharged outside a well one after another while performing so-called breaking to replace a drill bit or for other purposes. Since the scratch resulted from linking creates another scratch at other position during breaking and a number of scratches are induced at the sealing portions 12 and 22, galling is likely to be created.

Hence, an effective countermeasure to deal with galling due to a contact of an engagement type tubes is to determine a length $L_B$ of the sealing portion 22 of the box side in such a manner that the sealing portions 12 and 22 start interfering in a condition that the tip portion of the sealing portion 12 of the pin side is completely within the sealing portion 22 of the box side.

2) From the view point of dynamics, galling at a sealing portion of a surface-sealing type tube thread joint for a tube is generated when accumulated friction heat due to sliding under a surface pressure load exceeds a limit value locally at a sliding surface and the metal of a contact surface is partially melted. Hence, when the same materials are used under the same conditions, galling is larger likely to be generated as a value W expressed as below is larger:

W=P (Surface Pressure)×$L_S$ (Sliding Distance)

The surface pressure P is in proportion to the interference S (=$D_{PX}$—$D_{BX}$) within the range of elasticity. However, it is not affordable to reduce the interference S since a good sealing performance is to be maintained. Hence, to shorten the sliding distance $L_S$ is effective to prevent galling.

3) From a research on a relationship between the sliding distance $L_S$ and galling as to various outer diameters of tubes, the relationship as that shown in FIG. 4 was found. That is, when the sliding distance $L_S$ satisfies the following condition:

Sliding distance $L_S$/Outer Diameter of Tube OD≦−0.0093× (Outer Diameter of Tube OD)+4.73 (1)

galling due to the sliding distance $L_S$ is prevented. This means that when the outer diameters OD are the same, the sliding distance $L_S$ needs be smaller than an upper limit value which is determined by the outer diameters OD, and that the upper limit value becomes smaller as the outer diameters OD become smaller. Hence, the thread joint for a tube of the invention satisfies the relationship (1).

4) In the thread joint of the surface-sealing type for a tube, a dope is used for a lubricant between the sealing portions 12 and 22. If the sealing portions 12 and 22 interfere with each other when screwed, the dope disposed between the tip of the male thread 11 of the pin side and the point of interference is confined within a space which is shown by hatching in FIG. 2A. Compressed as tightening proceeds, the confined dope creates a dope pressure. Although the dope pressure contributes to improve the lubrication between the sealing portions 12 and 22, if too high, the dope pressure reduces the surface pressure P at the sealing portions 12 and 22 and therefore reduces the sealing performance. In a conventional thread joint, an incomplete thread is left untreated between the female thread 21 and the sealing portion 22 of the box side, and the dope which is confined in the above-mentioned small space is compressed under a high pressure by the male thread 11 of the pin side as if pressed by a piston. Because of this, the dope pressure largely increases, thereby decreasing the surface pressure P. This may deteriorate the sealing performance.

An effective countermeasure to deal with a deterioration in the sealing performance due to an increase in the dope pressure is to form a circumferential groove in the incomplete thread which exists between the female thread 21 and the sealing portion 22 of the box side.

Hence, considering these facts, the thread joint for a tube according to the present invention satisfies the following four requirements:

(a) The length $L_P$ of the sealing portion 12 of the pin side is larger than the length $L_B$ of the sealing portion 22 of the box side;

(b) The length $L_B$ of the sealing portion 22 of the box side is determined in such a manner that the sealing portions 12 and 22 start interfering with each other in a state in which the tip portion of the sealing portion 12 of the pin side is inside the sealing portions 12 of the box side;

(c) The sliding distance $L_S$ satisfies the relationship below:

Sliding Distance $L_S$≦−0.0093× (Tube Outer Diameter)$^2$+4.73× (Tube Outer Diameter); and (d) A circumferential groove 28 which has a width of 0.5 to 1.5 thread pitches is preferably formed between the female thread 21 and the sealing portion 22 of the box side.

5) The sliding distance ($L_S$) of the sealing portions is expressed approximately by:

$$L_S = MOS \times \pi \times D_S \div p \quad (2)$$
$$= S \times T_S \times \pi \times D_S \div p$$

where
S: Quantity of Interference (=$D_{PX}$–$D_{BX}$)
MOS: Make-Up On Seal Quantity
1/$T_S$: Inclination of Sealing Portion (Taper)
π: Circumferential Ratio
$D_S$: Sealing Portion Diameter
p: Thread Pitch The sealing portion diameter $D_S$ is a representative diameter of the sealing portions, such as the aforementioned $D_{PX}$ (Apex diameter of the sealing portion of the pin side), $D_{BX}$ (Apex diameter of the sealing portion of the box side) and DB (Maximum diameter of the sealing portion of the pin side).

As can be understood from the relationships above, if the thread pitch p, the sealing portion diameter $D_S$ and the interference S are equal, the smaller the $T_S$ is and the larger the inclination of the sealing portion ($1/T_S$) is, the shorter the sliding distance $L_S$ becomes. In short, if the inclination of the sealing portion ($1/T_S$) is increased from $\frac{1}{10}$ to $\frac{1}{4}$, the sliding distance $L_S$ is reduced to $\frac{4}{10}$ (=$\frac{1}{2.5}$).

6) In the thread joint of the surface-sealing type for a tube, as shown in FIG. 3, a precedent-stage unthreaded portion 14 (guiding surface 42) which has a smaller inclination than the sealing portion 12 (48) may be disposed between the male thread 11 (40) and the sealing portion 12 (48) of the pin side. In this case, in general, the precedent-stage unthreaded portion 14 and the sealing portion 12 are connected by an curve 15 which is tangent to both the precedent-stage unthreaded portion 14 and the sealing portion 12 as shown in FIGS. 9, 10. FIGS. 9, 10 are an enlarged view enlarging a portion A of FIG. 8. In a portion where the sealing portions 12 of the pin side and the sealing portion 22 of the box side starts getting separated from each other, i.e., in a portion x of the arc side which is close to a contact point X of the curve 15 and the sealing portion 12, a contact surface pressure D reaches a peak. Therefore, galling is created very often in this portion x in reality.

According to the research conducted by the inventors of the present invention, when the radius of curvature of an arc of the curve 15 which connects the precedent-stage unthreaded portion 14 and the sealing portion 12 is relatively small and the contact point X is close to an apex of the curve 15, the peak value of the surface pressure P becomes extremely large as shown by the solid line in the graph in FIG. 8. However, when the radius of curvature of the arc is increased and the contact point X is moved away from the apex of the curve 15, a position at which the surface pressure P reaches the peak value is moved, and in addition, the peak value becomes smaller, as shown by the dotted line. Hence, galling is unlikely to be created. The peak value of the surface pressure P becomes smaller because a change from a contacting state to a non-contact state becomes moderate due to the large radius of curvature of a boundary of the contact portion and a so-called Hertz's contact stress therefore becomes smaller.

Considering these facts, the thread joint for a tube according to the present invention satisfies another four requirements as follows:

(e) The inclinations of the sealing portions 12 and 22 are each a taper of $\frac{1}{6}$ or larger, and are larger than the inclinations of the threads 11 and 21;

(f) The length $L_B$ of the sealing portion 22 of the box side is longer than the length $L_P$ of the sealing portion 12 of the pin side;

(g) The precedent-stage unthreaded portion 14 whose inclination is smaller than that of the sealing portion 12 is disposed between the male thread 11 and the sealing portion 12 of the pin side, and the precedent-stage unthread portion 14 and the sealing portion 12 are connected to each other by the curve 15 which is tangent to the sealing portion 12; and (h) When the curve 15 includes a plurality of arcs (continuous curves), a distance $L_a$ between the contact point X and an end point Z of the arc tangent to the sealing portion 12 is 1.45 mm or larger. When the curve 15 is one arc (continuous curve), a distance $L_b$ which is measured from the contact point X to a boundary Y between the precedent-stage unthread portion 14 and the sealing portion 12 is 1.45 mm or larger.

The end point of the arc which is on the curve 15 and which is closest to the contact point X is designated because the contact of the seal starts to be lost in a portion where the radius of curvature becomes maximum. This portion is a boundary where the sealing surfaces are in a contact in reality. Further, the boundary Y between the precedent-stage unthread portion 14 and the sealing portion 12 is where extension lines extending from the precedent-stage unthread portion 14 and the sealing portion 12 intersect each other. If a fine radius of curvature R is formed in a portion of the boundary Y, the sealing surfaces contact each other in that portion as well, whereby the surface pressure reaches the peak in the vicinity of the boundary Y.

These above and further objects and features of the invention will more fully be apparent from the following detailed description with accompanying drawings.

DESCRIPTION OF THE PREFERRED EMBODIMENTS

In the following, the present invention will be described with reference to drawings which show embodiments of the present invention.

First Embodiment

First, description will be given on an embodiment in which the length of a sealing portion of a box side is set shorter than that of a sealing portion of a pin side to shorten a sliding distance $L_S$.

Figure 1A:
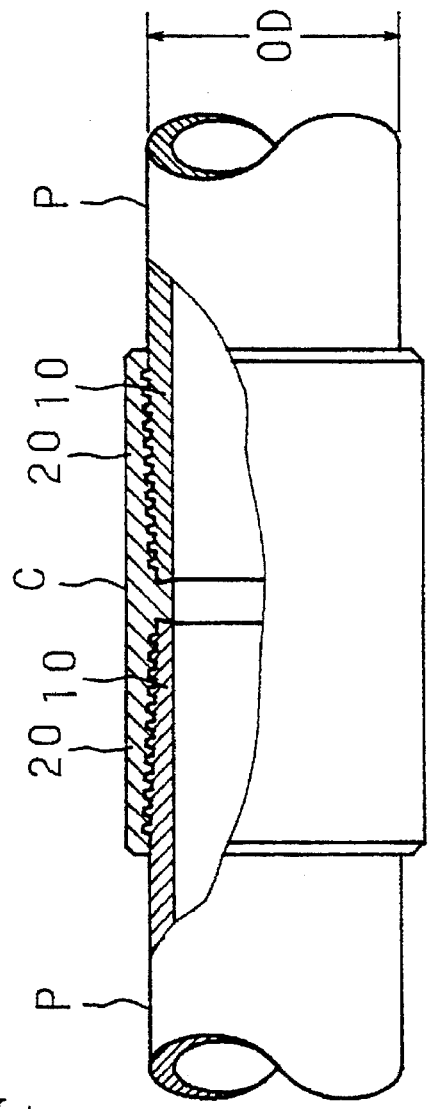
FIG. 1A is a partial broken view showing a thread joint of a surface-sealing type.
Figure 1B:
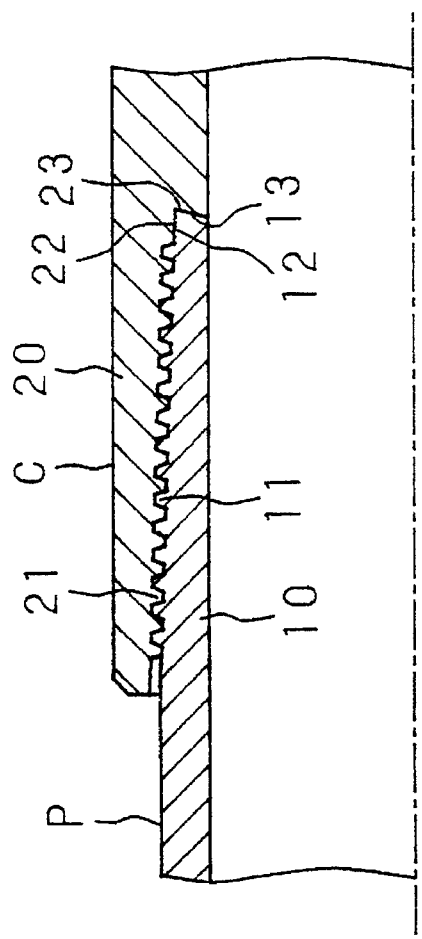
FIG. 1B is an enlarged view of FIG. 1A.
Figure 2A:
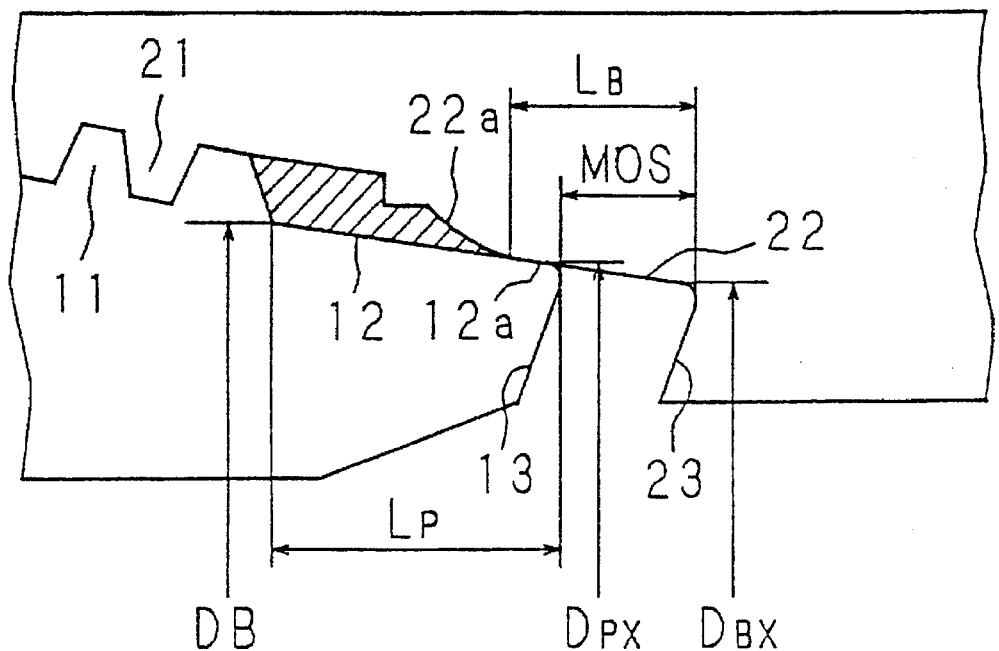
FIG. 2A is an enlarged view showing a sealing portion of a conventional joint.
Figure 2B:
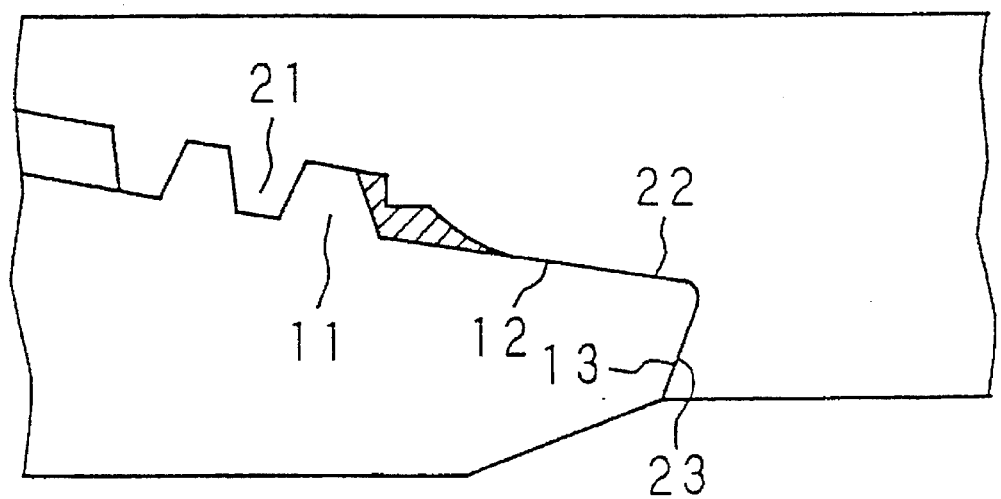
FIG. 2B is an enlarged view showing a sealing portion of a conventional joint.
Figure 3:
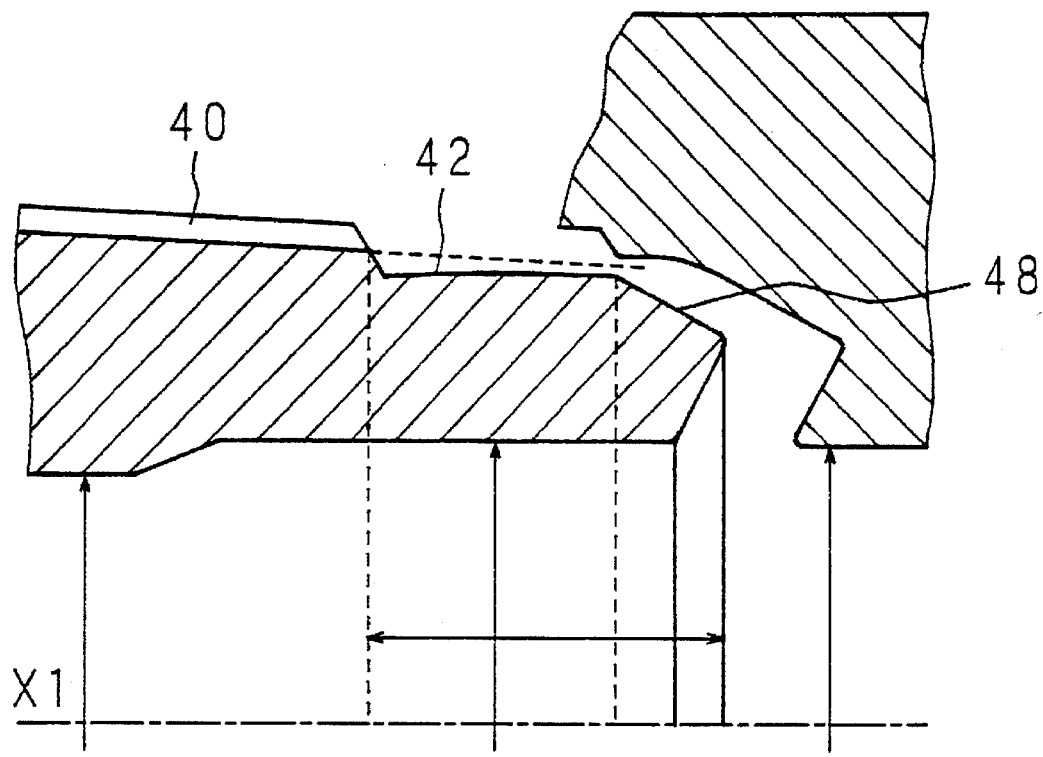
FIG. 3 is an enlarged view showing a sealing portion of a conventional joint.
Figure 5:
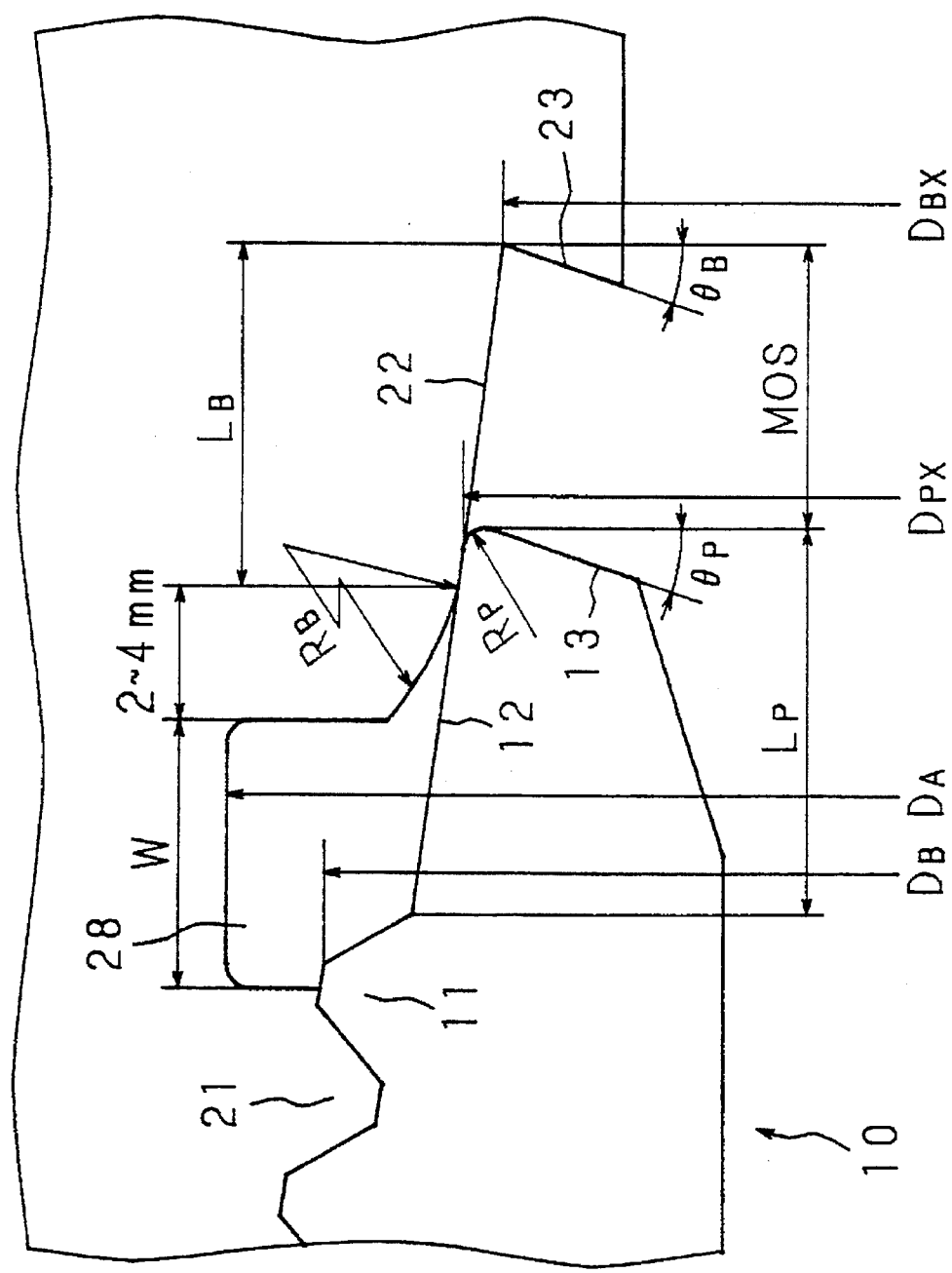
FIG. 5 is a cross sectional schematic diagram showing a thread joint for a tube according to a first embodiment.

FIG. 5 is a cross sectional view showing a portion in the vicinity of a sealing portion of a thread joint for a tube according to a first embodiment. Tubes P and P are connected to each other by a coupling C (see FIG. 1A). The tubes P each include a pin portion 10 which is inserted into the coupling C. The coupling C includes box portions 20 for receiving the pin portions 10.

The pin portion 10 includes a male thread 11 which tapers toward a tip with a gradually smaller diameter, on an outer periphery. A sealing portion 12 which tapers toward a tip with a gradually smaller diameter is formed on the tip of the male thread 11. The tip of the pin portion 10 is a shoulder portion 13 which is a partial reverse conic surface having a reverse angle with respect to a cross section which is perpendicular to an axis of the tube. An unthread portion is not formed. On the other hand, the box portion 20 internally includes a female thread 21 which corresponds to the male thread 11. A sealing portion 22 which corresponds to the sealing portion 12 is formed at a back part of the box portion 20, and at a further back part of the box portion 20, a shoulder portion 23 which corresponds to the shoulder portion 13 is formed.

Major four requirements in terms of structure in the present embodiment are as follows:

Structural Requirement (a)

If the length $L_P$ of the sealing portion 12 of the pin portion 10 is shorter than the length $L_B$ of the sealing portion 22 of the box portion 20, the shoulder portions 13 and 23 do not contact each other when tightening is completed, and therefore, so-called shouldering is not realized. To avoid this, the relationship $L_P \geq L_B$ should be satisfied.

Structural Requirement (b)

Because of the requirement (a), normally, the length $L_P$ of the sealing portion 12 of the pin side satisfies:

$$L_P = L_B + 2 \text{ to } 4 \text{ mm}$$

The tip portion of the sealing portion 12 of the pin side is rounded with a radius of $R_P$ while the entrance portion of the sealing portion 22 of the box side is rounded with a radius of $R_B$.

If the tapers of the sealing portions 12 and 22 are α ($=1/T_S$), a value obtained by multiplying α with the make-up on seal quantity MOS (α×MOS) becomes the interference S ($D_{PX}-D_{BX}$) which is necessary to ensure interference between the sealing portions 12 and 22. Once a maximum value $S_{MAX}$ of the interference S is determined, a maximum value $MOS_{MAX}$ of the make-up on seal quantity MOS is determined by the following equation:

$$MOS_{MAX} = S_{MAX}/\alpha$$

If $\alpha = 1/10$ and $S_{MAX} = 0.4$ mm, the value $MOS_{MAX}$ is 4 mm.

If the length $L_B$ of the sealing portion 22 of the box side is set larger than the value $MOS_{MAX}$, the sealing portions 12 and 22 start interfering with each other, that is, contact with each other in circumferential direction in a state, in which the tip portion of the sealing portion 12 of the pin side is inside the sealing portions 22 of the box side, whereby galling due to an engagement type contact is prevented.

In reality, the sealing portions 12 of the pin side has a tip of radius of curvature R ($R_P$) as described before. Considering this, the equation below is a condition to be satisfied to prevent galling which is created due to an engagement type contact:

$$L_B \geq R_P + MOS_{MAX}$$

When the interference S is small, $MOS < MOS_{MAX}$. Thus, galling becomes less likely also because the make-up on seal quantity MOS is small.

Structural Requirement (c)

Figure 4:
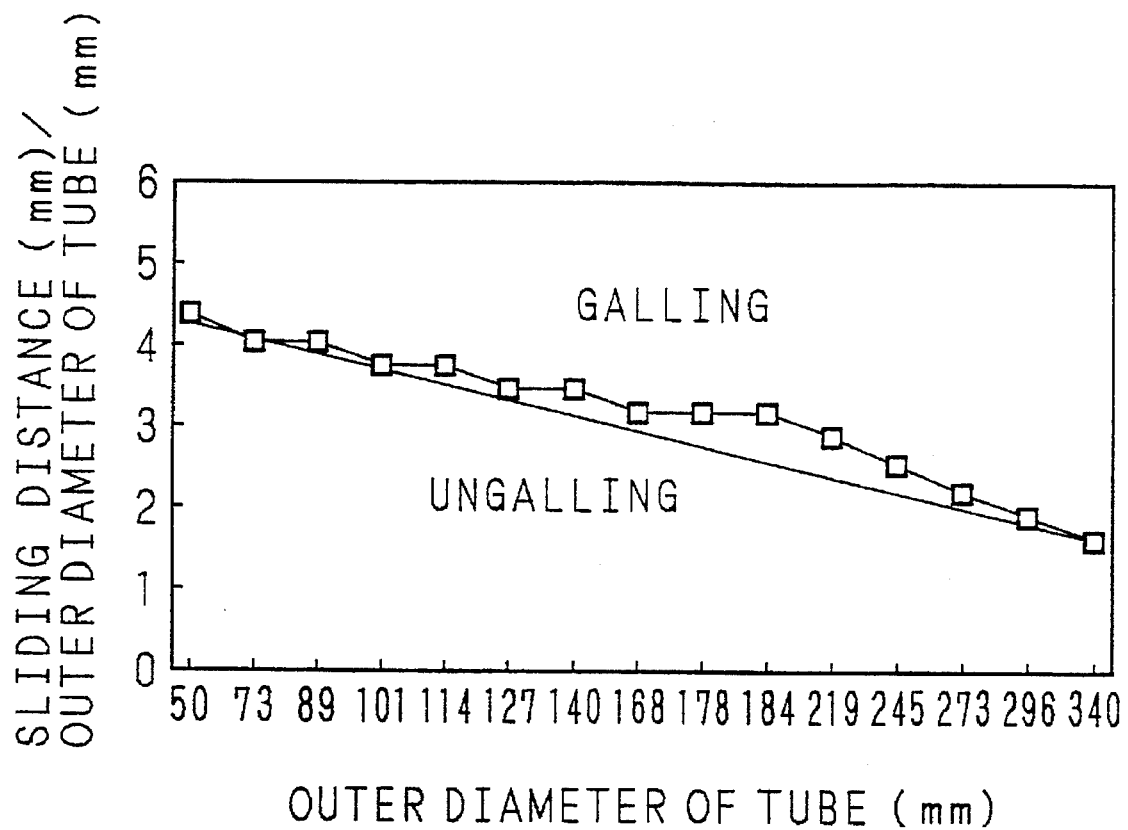
FIG. 4 is a graph showing a relationship between a sliding distance of a sealing portion and galling.

As the tube outer diameter OD becomes larger, the seal outer diameter $D_S$ such as the apex diameter $D_{PX}$ of the sealing portion of the pin side becomes larger. Hence, if the tapers of the sealing portions 12 and 22 are equally α, the sliding distance $L_S$ becomes larger as the tube outer diameter OD becomes larger. Although it apparently seems that galling is prevented if the sliding distance $L_S$ is set not to exceed a certain value regardless of the sliding distance $L_S$, in reality, as shown in FIG. 4, the sliding distance $L_S$ which is necessary to prevent galling is under an influence of the tube outer diameter OD. Hence, the conditions shown in FIG. 4, that is, the conditions below must be satisfied:

Sliding Distance $L_S$/Tube Outer Diameter OD $\leq -0.0093\times$ (Tube Outer Diameter OD)+4.73

Sliding Distance $L_S \leq -0.0093\times$ (Tube Outer Diameter OD)$^2$ + 4.73× (Tube Outer Diameter OD)

In other words, the sliding distance $L_S$ is set smaller than the upper limit value (the right-hand side of the lower one of the conditions) which is determined by the tube outer diameter OD.

The make-up on seal quantity MOS is reduced to decrease the sliding distance $L_S$. In short, the tapers of the sealing portions 12 and 22 are increased if the quantity of interference is same. This prevents galling due to the sliding distance $L_S$.

The reason why the sliding distance $L_S$ which is needed to prevent galling is influenced by the tube outer diameter OD may be as follows. As the tube outer diameter becomes larger, the roundness becomes smaller and an oval quantity increases, which in turn allows an oval to exert an influence during interference at the sealing portions. As the oval quantity increases larger, galling is larger likely to be created. Thus, the tube outer diameter affects a galling limit.

The tapers α of the sealing portions 12 and 22 are preferably selected in a range from 1/20 (a gradient of 1.432 degrees) to 1/4 (a gradient of 7.125 degrees). If the gradient is smaller than 1.432 degrees, the sliding distance $L_S$ becomes long even if the diameter is small, which is close to the galling limit. The gradient exceeding 7.125 degrees, which causes the surface pressure to drop excessively largely under an axial tension, is not desirable, considering the leak resistance.

Further, the terminal surface angles of the shoulder portions 13 and 23, which are expressed as angles $\theta_P$ and $\theta_B$ with respect to the tube diameters, are preferably 0 to 5 degrees. The terminal surface angle of 5 degrees or larger is not desirable since that angle causes shoulder inner surfaces to deform largely during shouldering. The terminal surface angle of 0 degree or smaller is not desirable since that angle permits the shoulder portion 13 to project into the inside of the shoulder portion 23 rather than supporting the metal sealing portions.

Structural Requirement (d)

At the start of interference between the sealing portions 12 and 22, the dope confined forward the male thread 11 of the pin side is compressed because of subsequent tightening. Assuming that the volume of the space in which the dope is confined is V at the start of interference between the sealing portions 12 and 22 but V' at the end of tightening, the compression rate of the dope is expressed as:

V/V'

As the compression rate is larger, the dope pressure becomes larger because of a piston effect, thereby reducing the surface pressure P.

While the compression rate is high since the incomplete thread which exists between the female thread 21 and the sealing portion 22 of the box side is left untreated in the conventional thread joint, the compression rate is suppressed since the circumferential groove 28 is formed at the incomplete thread.

The reason is as follows. Assuming that the value V for the conventional thread joint is Vo, the value V' for the conventional thread joint is Vo', the volume of the circumferential groove 28 at the start of interference between the sealing portions 12 and 22 is Vn, and the volume of the circumferential groove 28 at end of tightening is Vn', since the circumferential groove 28 is formed the compression rate changes as below:

$$Vo/Vo' \to (Vo+Vn)/(Vo'+Vn')$$

Since Vn=Vn', $$Vo/Vo' > (Vo+Vn)/(Vo'+Vn')$$

This reduces the dope pressure at the end of tightening, which makes it possible to obviate an adverse affect upon the surface pressure P. The dope pressure at the end of tightening is preferably 400 kg/cm$^2$ or less.

A width W of the circumferential groove 28 is 1.5 to 2 pitches measured in pitches of the threads. If the width W is smaller than 1.5 pitches, uppercut of the thread cannot be completed within the groove when a 2-thread chaser is used. If the width W exceeds 2 pitches, since the length that the threads of the pin and the box engage with each other becomes shorter, an efficiency of transmitting the axial tension is deteriorated.

A depth of the circumferential groove 28, which is expressed using a diameter $D_A$ of a bottom of the groove, is preferably a Chasing Diameter of the Female Thread of the Box Side $D_B$+0.2 to 0.5 mm. If the depth is smaller than $D_B$+0.2 mm, there is a possibility that a thread bottom interferes with the groove bottom when the box thread chaser is worn out. If the depth exceeds $D_B$+0.5 mm, the thickness of the bottom of the groove becomes thinner, and hence, the strength of the joint is deteriorated.

In the following, result of comparison between specific embodiments and examples for comparison will be described, to thereby make effects of the present invention clear.

Various surface-seal type thread joints were made which satisfy the specifications given in TABLE 1, for tubes of three sizes which are defined as Tube Outer Diameter×Wall Thickness of 3-½" (88.9 mm)×0.254" (6.45 mm), 7" (177.8 mm)×0.408" (10.36 mm), 13-⅜" (339.7 mm)×0.514" (13.06 mm). Using a dope, binding (make)·break was repeated until galling resulted in the sealing portions. The numbers of repetitions are as given in TABLE 1.

In any one of these thread joints, the length $L_P$ of the sealing portion 12 of the pin side is set longer than the length $L_B$ of the sealing portion 22 of the box side, in those numbered as Nos. 1, 4 and 7, since the length $L_B$ of the sealing portion 22 of the box side does not satisfy the following relationship:

$$L_B \geq R_P + MOS_{MAX}$$

galling was created at an initial stage due to an engagement type contact. In those numbered as Nos. 2, 5 and 8, since the following relationship is not satisfied:

Sliding Distance $L_S \leq -0.0093 \times$ (Tube Outer Diameter OD)$^2$+ 4.73× (Tube Outer Diameter)

galling was created at an initial stage due to the sliding distance $L_S$.

In contrast, since these conditions are both satisfied in those numbered as Nos. 3, 6 and 9, both galling due to an engagement type contact and galling due to the sliding distance $L_S$ were suppressed. As a result, the number of the repetitions was dramatically increased than in Nos. 1, 2, 4, 5, 7 and 8.

Next, in a thread joint numbered as No. 6 having a medium diameter size, a circumferential groove was formed in the incomplete thread between the female thread and the sealing portion of the box side. The width of circumferential groove was 1.5 pitches as expressed in the pitches of the thread, and the depth of the circumferential groove was the Chasing Diameter+0.3 mm as expressed in the diameter of the bottom of the groove.

Figure 6:
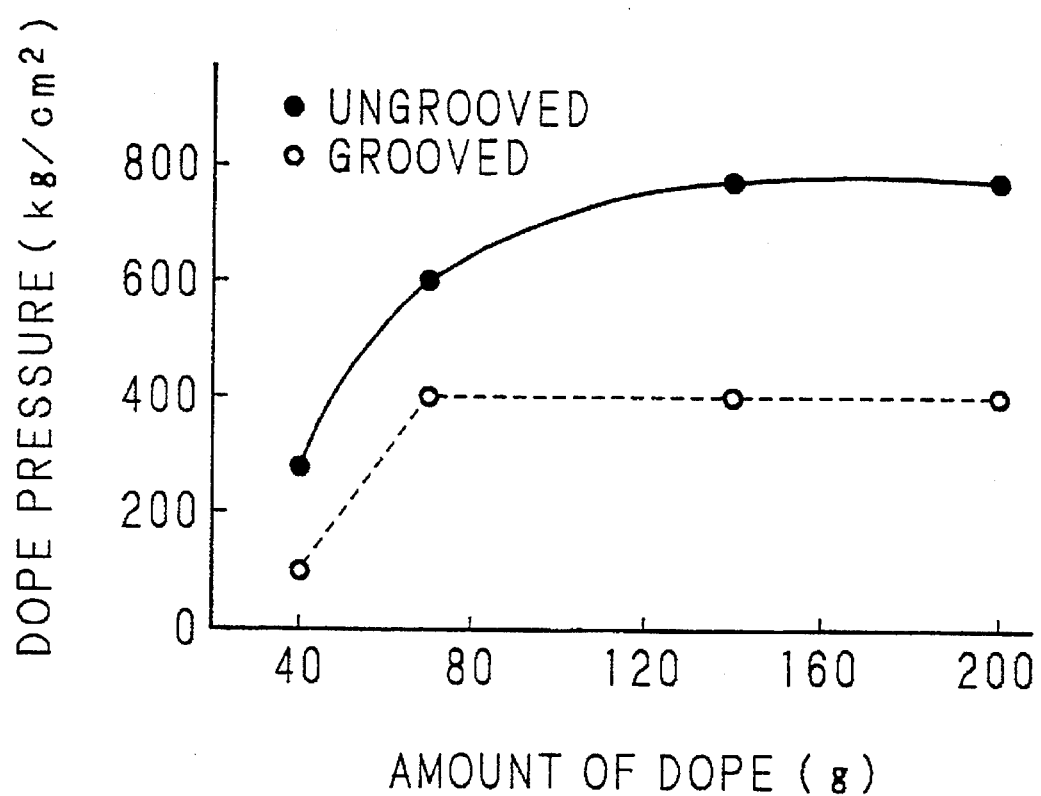
FIG. 6 is a graph showing an influence of whether a circumferential groove is formed upon a dope pressure.
Figure 7A:
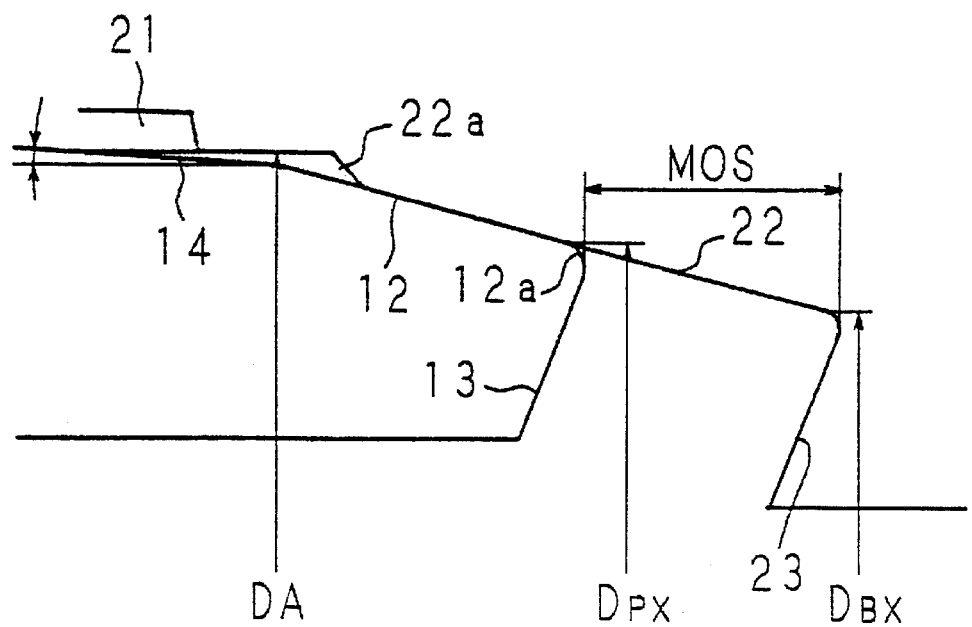
FIG. 7A is a cross sectional schematic diagram showing a thread joint for a tube according to a second embodiment.
Figure 7B:
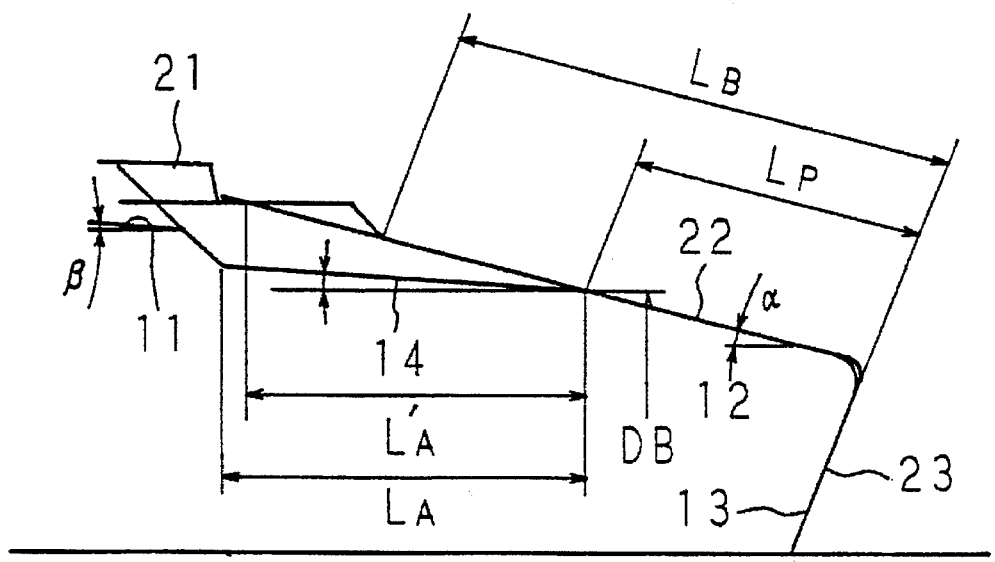
FIG. 7B is a cross sectional schematic diagram showing a thread joint for a tube according to the second embodiment.
Figure 8:
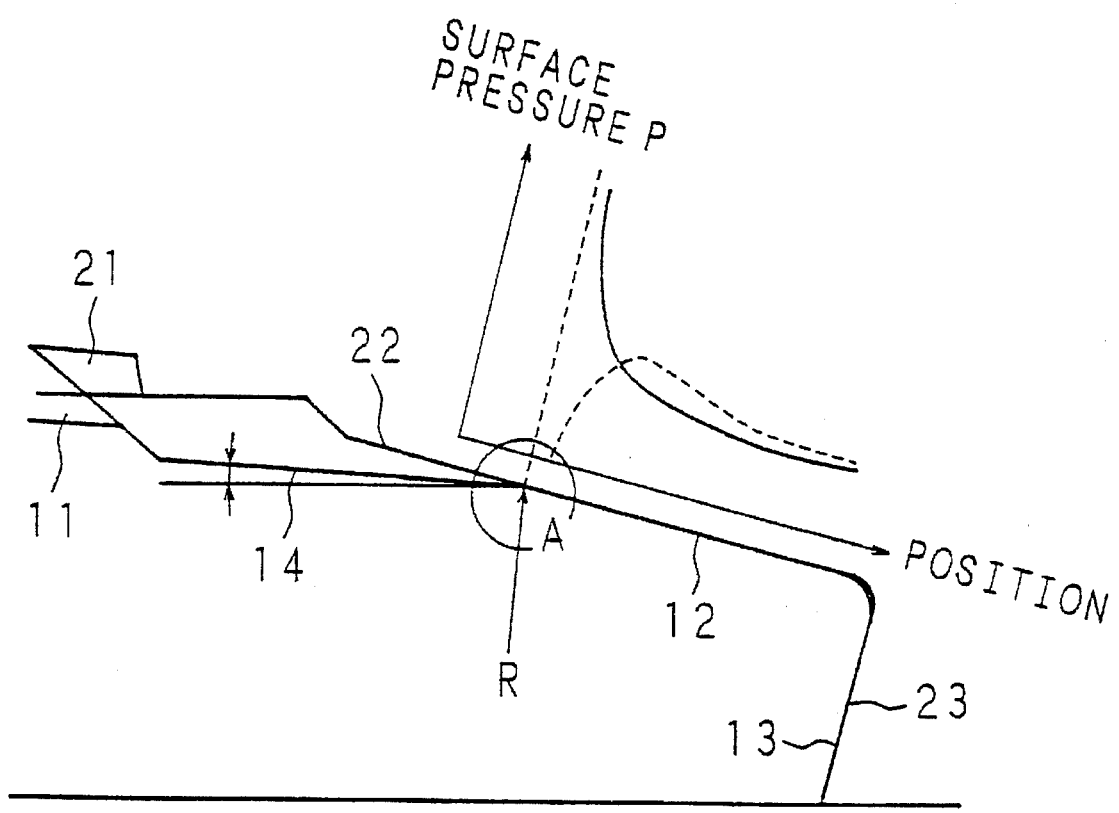
FIG. 8 is a view showing a connection portion between a precedent-stage unthread portion and a sealing portion, and a relationship between a configuration of the connection portion and a surface pressure distribution.

The dope quantity was changed into four variations of 40 g, 70 g, 140 g and 200 g, and the dope pressure as of after completion of tightening was measured with each such dope quantity. The dope pressure was measured using a transducer through a threaded tap hole which is formed in the joint. FIG. 6 shows result of the measurement.

When the circumferential groove is formed in the incomplete thread of the box side, the dope pressure is reduced. The effect of this is greater as the dope quantity is larger.

As described earlier, in the thread joint for a tube according to the first embodiment, it is possible to effectively suppress galling at the sealing portions which has been problem in joints of the surface-sealing type, i.e., both galling due to an engagement type contact and galling due to the sliding distance, so that the number of the repetitions was dramatically increased. In addition, since it is not necessary to reduce the quantity of interference which is needed to ensure the sealing performance, there is no possibility that the sealing performance will be deteriorated.

When the circumferential groove is formed between the female thread and the sealing portion of the box side, the dope pressure as it is at completion of tightening is reduced. This suppresses a drop in the surface pressure at the sealing portion, which in turn improves the sealing performance.

Second Embodiment

Now, a description will be given on an embodiment in which the length of the sealing portion of the box side is set longer than the length of the sealing portion of the pin side in order to shorten the sliding distance $L_S$.

FIGS. 7A, 7B, 8, 9 and 10 are cross sectional views showing a portion which is in the vicinity of the sealing portion in the second embodiment. Inclinations of the sealing portions 12 and 22 each have a taper of ⅙ or larger, and are larger than inclinations of the threads 11 and 21. The length $L_B$ of the sealing portion 22 of the box side is larger than the length $L_P$ of the sealing portion 12 of the pin side. The precedent-stage unthread portion 14 whose inclination is smaller than that of the sealing portion 12 is formed between the male thread 11 and the sealing portion 12 of the pin side, and the precedent-stage unthread portion 14 and the sealing portion 12 are connected to each other by the curve 15 (FIGS. 9, 10) which is tangent to the sealing portion 12. When the curve 15 includes a plurality of arcs (continuous curves), a distance $L_a$ between the contact point X and an end point Z of the arc tangent to the sealing portion 12 is 1.45 mm or larger. When the curve 15 is one arc (continuous curve), a distance $L_b$ which is measured from the contact point X to a boundary Y between the precedent-stage unthread portion 14 and the sealing portion 12 is 1.45 mm or larger.

The inclinations of the sealing portions 12 and 22 are set larger than the inclinations of the threads 11 and 21 in order to avoid collision of the tip 12a of the sealing portion 12 of the pin side and the entrance 22a of the sealing portion 22 of the box side during screwing-in. Such collision creates a scratch in the sealing portions 12 and 22, and the sliding of the sealing portions 12 and 22 at subsequent screwing subjects to create galling in the sealing portions 12 and 22 at the position of the scratch. By preventing collision of the tip 12a of the sealing portion 12 and the entrance 22a of the sealing portion 22, one of the causes of galling the sealing portions 12 and 22 is removed. Where the inclination of the sealing portions with respect to the tube axis is $\alpha$ and the inclination of the threads is $\beta$, it is preferable that the relationship $4/3 \leq \alpha/\beta \leq 14.6$ is satisfied. Too large value $\alpha/\beta$ is not desirable from the view point of maintaining the sealing performance under an axial tension applied.

The purpose of setting the length $L_B$ of the sealing portion 22 of the box side longer than the length $L_P$ of the sealing portion 12 of the pin side is also to prevent collision of the tip 12a of the sealing portion 12 and the entrance 22a of the sealing portion 22 by increasing the diameter difference between the diameter of the entrance of the sealing portion 22 and the diameter of the tip of the sealing portion 12. The value $L_B/L_P$ is preferably expressed by EQUATION (1). Too large value $L_B/L_P$ makes processing difficult since the sealing portion 22 and the thread 21 of the box side get too close to each other.

EQUATION (1)

$$1 + \frac{R_B}{L_P} \leq \frac{L_B}{L_P} \leq \left( \frac{L_A}{\cos\left\{\tan^{-1}\frac{1}{2T_S}\right\}} + L_P \right) / L_P$$

$$\text{or} \leq \left( \frac{(DA - DB)T_S}{\cos\left\{\tan^{-1}\frac{1}{2T_S}\right\}} + L_P \right) / L_P$$

Even if the length $L_B$ of the sealing portion 22 of the box side is shorter than the length $L_P$ of the sealing portion 12 of the pin side, by increasing the length of an areas in which the sealing portions 12 and 22 contact mutually each other, or increasing the angles of the inclination of the sealing portions 12 and 22, the diameter difference between the diameter of the entrance of the sealing portion 22 and the diameter of the tip of the sealing portion 12 becomes larger, thereby preventing such collision described above. In the embodiment the inclinations of the sealing portions 12 and 22 are as steep as 1/6 or larger as described later, and whereby the length $L_B$ of the sealing portion 22 of the box side is set longer than the length $L_P$ of the sealing portion 12 of the pin side.

The purpose of setting the inclinations $\alpha$ of the sealing portions 12 and 22 as tapers of 1/6 or larger is to reduce the sliding distance $L_S$ of the sealing portions 12 and 22 and hence to the value W which is expressed as:

W=P (Surface Pressure)×$L_S$ (Sliding Distance)

so that galling is made unlikely. The inclinations are preferably $1/4 \leq \alpha \leq 1/1.373$. Too large value $\alpha$ is not desirable from the view point of maintaining the sealing performance under an axial tension applied.

The purpose of disposing the precedent-stage unthread portion 14, whose inclination is smaller than that of the sealing portion 12, between the male thread 11 and the sealing portion 12 of the pin side, and connecting the precedent-stage unthread portion 14 and the sealing portion 12 by the carve 15 which is tangent to the sealing portion 12 is to increase the portion x where the sealing portions 12 and 22 contact each other, to thereby gradually separating the sealing portions 12 and 22 from each other and decrease the peak value of the contact surface pressure P.

Figure 9:
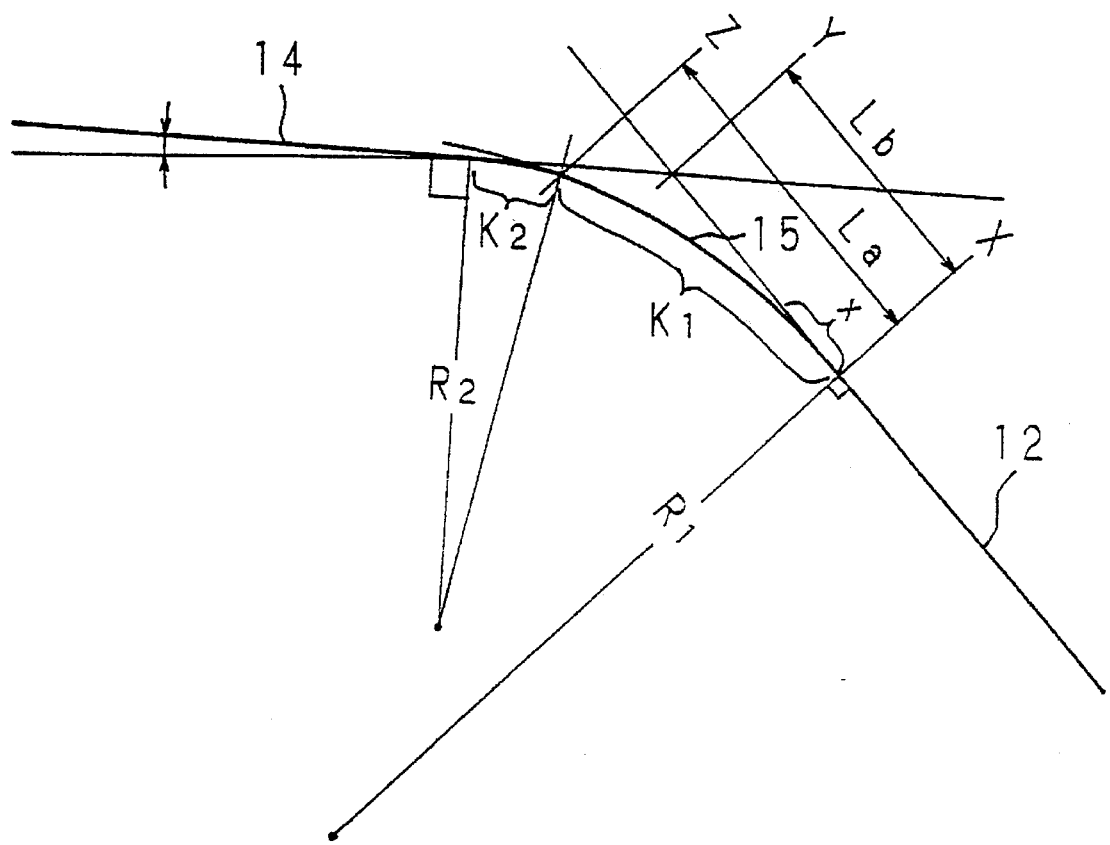
FIG. 9 is an enlarged view showing a portion A of FIG. 8.

FIG. 9 shows a case where a distance $L_a$ from an end point Z (a position in the direction of the surface of the sealing portion 12) to a contact point X of a circular arc $K_1$ tangent to the sealing portion 12, is larger than a distance $L_b$, the curve 15 comprising the circular arc $K_1$ of a radius $R_1$ and a circular arc $K_2$ of a radius $R_2$. The circular arc $K_2$ is tangent to the precedent-stage unthread portion 14.

Figure 10:
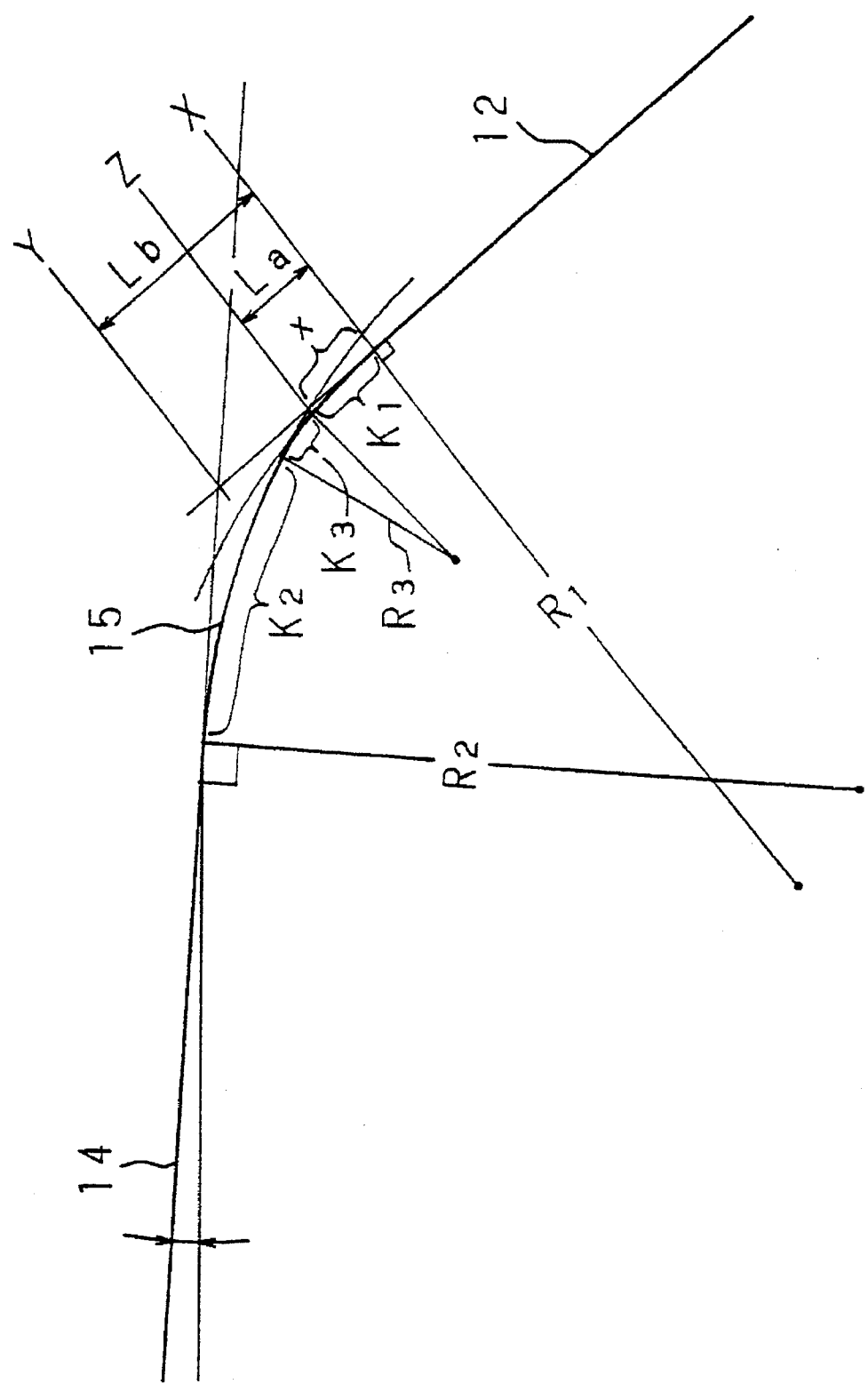
FIG. 10 is an enlarged view showing the portion A of FIG. 8.

FIG. 10 shows a case when a distance $L_a$ from an end point Z (a position in the direction of the surface of the sealing portion 12) to a contact point X of a circular arc $K_1$ of a radius $R_1$ and tangent to the sealing portion 12, is smaller than a distance $L_b$, the curve 15 comprising the circular arc $K_1$ of a radius $R_1$, a circular arc $K_2$ of a radius $R_2$ and a circular arc $K_3$ of a radius $R_3$. The circular arc $K_2$ is tangent to the precedent-stage unthread portion 14. The circular arc $K_3$ is tangent to the circular arc $K_1$ and the circular arc $K_2$. In these cases, the distance $L_a$ is set to be 1.45 mm or larger, since the curve 15 includes a plurality of arcs.

When the curve 15 is a single circular arc (radius $R_1$) tangent to the sealing portion 12 and precedent-stage unthread portion 14, the distance $L_b$ is set to be 1.45 mm or larger.

Assuming that the precedent-stage unthread portion 14 is a straight surface which is parallel to the tube axis, a radius $R_1$ of the circular arc which is needed to realize $L_a$ ($L_b$) $\geq 1.45$ mm is 12 mm or larger if the tapers of the sealing portions are 1/2 but 24 mm or larger if the tapers of the sealing portions are 1/4.

Although the galling resistance changes depending on a surface treatment, $R_1 \geq 13$ mm if the tapers of the sealing portions are 1/2 but $R_1 \geq 26$ mm if the tapers of the sealing portions are 1/4. That is, by adopting a combination of tapers of the sealing portions which have the distance $L_a$ of 1.6 mm or larger and the radius $R_1$, the galling resistance remains excellent regardless of the type of the surface treatment. From this point of view, the distance above is preferably 1.6 mm or larger.

As to an upper limit of the distance above, from a view point measurement of the seal diameters, it is desirable that $L_a$ ($L_b$) $\leq (L_P$-Tip Radius $R_P$)-2, i.e., that is, the sealing portion of the pin side includes a taper portion (straight portion) of at least about 2 mm. This is desirable also from a view point of the surface pressure distribution at the sealing surfaces. If there is no taper portion, the seal surface pressure distribution has a mountain-like configuration, indicating that galling is likely to be created at that portion. Further, such makes measurement of the pin side seal diameter difficult and makes it impossible to accurately set the interference with the sealing surfaces of the box side.

Next, results of comparing the specific embodiments and the examples for comparison will be described, in order to clarify the effect obtained in the present invention.

Various joints whose sizes are defined in TABLES 2, 3 and 4 were made as thread joints of a coupling type for tubes. The threads of the various prototype joints are coated with a lubricant compound, and a tightening test was conducted in which binding/break is repeated until galling is made at the sealing portions. The maximum number of repetitions was 10. TABLES 5 and 6 show results.

As can be understood from TABLE 6, in the examples for comparison, scratches (thin linear defects) are created with a small number of binding/break. After amending using an oil stone or the like, galling was created soon during re-use. Further re-use (binding/break) was impossible. However, as can be understood from TABLE 5, binding/break was possible up to ten times according to the embodiment in any one of the cases. The reason for setting the maximum number of repetitions of binding/break as 10 is because the number of repetitions usually adopted in a test for examining the galling resistance of a joint for tubing is 10.

Although the embodiment above is related to the coupling method, similar effects are created in the case of an integral method as well.

The curve for connecting the precedent-stage unthread portion and the sealing portion of the pin side was described in relation to where the curve is a single circular arc. However, similar effects are created even when the single arc is approximated by a multi-dimension burro or a combination of multi curves.

The precedent-stage unthread portion was described in relation to where this portion is parallel to the axis of the tube. However, even when this portion is inclined, by changing the inclinations of the sealing portions in such a manner that the angle with respect to the sealing portions becomes same as those in the embodiments, the distance between the boundary Y and the contact point X is made same if the radius R of the connecting arc is same, thereby creating same effects.

As described above, in the thread joints for tubes according to the present invention, galling at the sealing portions which has been a problem with the surface-sealing method is largely suppressed. Further, since it is not necessary to reduce the quantity of interference which is needed to ensure the sealing performance, there is no possibility that the sealing performance will be deteriorated.

Figure 11:
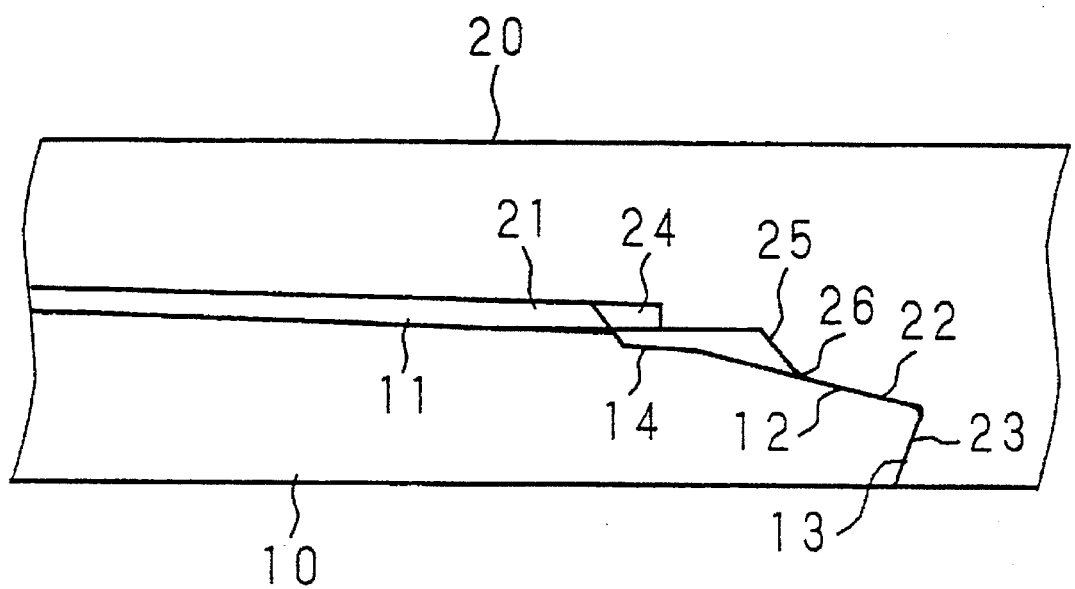
FIG. 11 is a cross sectional schematic diagram showing modulated example of the second embodiment.

FIG. 11 is a cross sectional schematic diagram showing a modulated example of the second embodiment. In this example, the length $L_B$ of the sealing portion 22 of the box side is set shorter than the length $L_P$ of the sealing portion 12 of the pin side. An incomplete thread 24 and a seal guiding surface 25 are formed between the female thread 21 and sealing portion 22 of the box portion 20.

The seal guiding surface 25 and sealing portion 22 are connected to each other by a curve 26 which is tangent to the sealing portion 22. The curve 26 has the distance from the contact point between the sealing portion 22 and the curve 26 to the point separating from the sealing portion 12 of the pin portion 10, of 1.45 mm or larger, same as the curve 15 in the embodiment 2. This example obtains the same effect as the embodiment 2, that is, the peak value of the contact surface pressure P is decreased.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

TABLE 1

| No | OUTER DIAMETER OF TUBE (mm) | WALL THICKNESS (mm) | $R_P$ | $L_B$ (mm) | $MOS_{MAX}$ | TAPER | $L_S$ (mm) | NUMBER OF TIMES |
| --- | --- | --- | --- | --- | --- | --- | --- | --- |
| 1 | 88.9 | 6.45 | 1.5 | 4.5 | 4.0 | 1/10 | 300 | 1 |
| 2 | | | 1.0 | 5.2 | 4.0 | 1/12 | 360 | 3 |
| 3 | | | 1.0 | 5.2 | 4.0 | 1/10 | 300 | 15 |
| 4 | 177.8 | 10.36 | 1.5 | 5.5 | 5.0 | 1/10 | 500 | 1 |
| 5 | | | 1.2 | 6.5 | 5.0 | 1/12 | 750 | 3 |
| 6 | | | 1.2 | 6.5 | 5.0 | 1/8 | 500 | 10 |
| 7 | 339.7 | 13.06 | 1.5 | 5.5 | 5.0 | 1/4 | 500 | 1 |
| 8 | | | 1.4 | 6.5 | 5.0 | 1/8 | 1000 | 4 |
| 9 | | | 1.4 | 6.5 | 5.0 | 1/4 | 500 | 10 |

TABLE 2

| | 1 | 2 |
| --- | --- | --- |
| OUTER DIAMETER OF TUBE | 273.05 mm (10.75") | 177.80 mm (7") |
| WALL THICKNESS | 24.38 mm (0.960") | 11.51 mm (0.453") |
| OUTER DIAMETER OF COUPLING | 300.35 mm | 195.98 mm |
| MATERIALS OF TUBE AND COUPLING | API ST. C 95 (YIELD STRENGTH OF | LOW ALLOY STEEL OF YIELD STRENGTH OF |

TABLE 2-continued

|  | 1 | 2 |
| --- | --- | --- |
|  | 66.79 kgf/mm$^2$) | 70.31 kgf/mm$^2$ |
| UNTHREAD PORTION | PARALLEL TO AXIS | PARALLEL TO AXIS |
| CURVE BETWEEN UNTHREAD PORTION AND SEALING PORTION | ONE TANGENTIAL ARC | ONE TANGENTIAL ARC |
| RADIUS OF CURVATURE | VARIABLE (TABLE 2) | VARIABLE (TABLE 2) |
| SEAL TAPER | VARIABLE (TABLE 2) | VARIABLE (TABLE 2) |
| SEAL LENGTH | VARIABLE (TABLE 2) | VARIABLE (TABLE 2) |
| THREAD TAPER | 1/5.5 (CONSTANT) | 1/16 (CONSTANT) |
| THREAD FORM | TRAPEZOID | TRAPEZOID |
| THREAD PITCH | 6.35 mm (4 THREADS/INCH) | 5.08 mm (5 THREADS/INCH) |
| THREAD HEIGHT | 2.400 mm | 1.575 mm |
| SURFACE TREATMENT | PHOSPHORIC ACID COATING OR BOX WITH COPPER PLATING | PHOSPHORIC ACID COATING OR BOX WITH COPPER PLATING |
| DIAMETER OF SEALING PORTION | 264.70 mm | 171.00 mm |
| INTERFERENCE ($D_{PX}-D_{BX}$) | Max 0.95 mm | Max 0.75 mm |
| SLIDING DISTANCE $L_S$ | 598 mm | 547 mm |

TABLE 3

(EMBODIMENT)

| Gr. | No. | TAPER OF SEALING PORTION | $L_P$ (mm) | $L_B$ (mm) | RADIUS OF CURVATURE (mm) | L (mm) | $L_S$ (mm) |  |
| --- | --- | --- | --- | --- | --- | --- | --- | --- |
| 1 | A, A' | 1/2 | 6.0 | 10.0 | 12 | 1.478 | 250 | o |
|  | B | 1/2 | 6.0 | 10.0 | 13 | 1.600 | 250 | o |
|  | C | 1/2 | 6.0 | 10.0 | 16 | 1.970 | 250 | o |
|  | D, D' | 1/4 | 6.0 | 10.0 | 24 | 1.494 | 497 | o |
|  | E | 1/4 | 6.0 | 10.0 | 26 | 1.619 | 497 | o |
|  | F | 1/4 | 6.0 | 10.0 | 32 | 1.992 | 497 | o |
|  | G | 1/5 | 6.0 | 10.0 | 32 | 1.596 | 621 | x |
|  | H | 1/6 | 6.0 | 10.0 | 36 | 1.497 | 745 | x |
|  | I | 1/6 | 6.0 | 10.0 | 48 | 1.997 | 745 | x |
| 2 | J | 1/4 | 6.5 | 10.5 | 24 | 1.494 | 317 | o |
|  | K | 1/4 | 6.5 | 10.5 | 26 | 1.612 | 317 | o |
|  | L | 1/4 | 6.5 | 10.5 | 32 | 1.992 | 317 | o |
|  | M | 1/6 | 6.5 | 10.5 | 36 | 1.497 | 476 | o |
|  | N | 1/6 | 6.5 | 10.5 | 40 | 1.664 | 476 | o |
|  | O | 1/6 | 6.5 | 10.5 | 44 | 1.830 | 476 | o |
|  | P | 1/7 | 6.5 | 10.5 | 44 | 1.569 | 555 | x |
|  | Q | 1/8 | 6.5 | 10.5 | 48 | 1.499 | 634 | x |
|  | R | 1/8 | 6.5 | 10.5 | 52 | 1.623 | 634 | X |

A': BOX WITH COPPER PLATE
D': BOX WITH COPPER PLATE
ALL EXCEPT A' AND D': PHOSPHORIC ACID COATING

TABLE 4

(COMPARABLE EXAMPLE)

| Gr. | No | SEAL TAPER | $L_P$ (mm) | $L_B$ (mm) | RADIUS OF CURVATURE (mm) | L (mm) | $L_S$ (mm) |  |
| --- | --- | --- | --- | --- | --- | --- | --- | --- |
| 1 | S | 1/2 | 6.0 | 10.0 | 8 | 0.985*3 | 250 | o |
|  | T | 1/2 | 6.0 | 10.0 | 10 | 1.231*3 | 250 | o |
|  | U | 1/2 | 6.0 | 10.0 | 11 | 1.354*3 | 250 | o |
|  | V | 1/4 | 6.0 | 10.0 | 16 | 0.996*3 | 497 | o |
|  | W | 1/4 | 6.0 | 10.0 | 22 | 1.370*3 | 497 | o |
|  | x | 1/4 | 8.0*2 | 5.0*2 | 26 | 1.619 | 497 | o |
|  | Y | 1/8 | 6.0 | 10.0 | 48 | 1.499 | 994 | x |
| 2 | Z | 1/4 | 6.5 | 10.5 | 20 | 1.245*3 | 317 | o |
|  | AA | 1/4 | 6.5 | 10.5 | 22 | 1.370*3 | 317 | o |
|  | AB | 1/6 | 6.5 | 10.5 | 32 | 1.331*3 | 476 | o |
|  | AC | 1/6 | 6.5 | 10.5 | 34 | 1.414*3 | 476 | o |
|  | AD | 1/10 | 7.5*2 | 6.5*2 | (4.5) | (1.086) | 793 | x |
|  | AE | 1/16*1 | 11.0*2 | 7.5*2 | — | — | 1268 | X |

*1: SEAL TAPER < THREAD TAPER
*2: $L_P > L_B$
*3: L < 1.45
( ): BOX SIDE

TABLE 5

(EMBODIMENT)

| Gr. | No. | SCRATCH | 10th TIMES |
|---|---|---|---|
| 1 | A | 7th TIMES | OK (WITH CARE) |
|   | A' | NO | OK |
|   | B | NO | OK |
|   | C | NO | OK |
|   | D | 6th TIMES | OK (WITH CARE) |
|   | D' | NO | OK |
|   | E | 9th TIMES | OK (WITH CARE) |
|   | F | NO | OK |
|   | G | 9th TIMES | OK (WITH CARE) |
|   | H | 7th TIMES | OK (WITH CARE) |
|   | I | 9th TIMES | OK (WITH CARE) |
| 2 | J | 8th TIMES | OK (WITH CARE) |
|   | K | NO | OK |
|   | L | NO | OK |
|   | M | 7th TIMES | OK (WITH CARE) |
|   | N | NO | OK |
|   | O | NO | OK |
|   | P | NO | OK |
|   | Q | 9th TIMES | OK (WITH CARE) |
|   | R | 7th TIMES | OK (WITH CARE) |

TABLE 6

(COMPARABLE EXAMPLE)

| Gr. | No. | SCRATCH | GALLING |
|---|---|---|---|
| 1 | S | → | 1st TIME |
|   | T | 2nd TIMES | 3rd TIMES |
|   | U | 3rd TIMES | 5th TIMES |
|   | V | 1st TIME | 2nd TIMES |
|   | W | 2nd TIMES | 3rd TIMES |
|   | x | 1st TIME (START FROM TIP OF PIN) | 2nd TIMES |
|   | Y | 3rd TIMES | 4th TIMES |
| 2 | Z | 2nd TIMES | 4th TIMES |
|   | AA | 3rd TIMES | 4th TIMES |
|   | AB | 2nd TIMES | 3rd TIMES |
|   | AC | 3rd TIMES | 5th TIMES |
|   | AD | 1st TIME (START FROM TIP OF PIN) | 2nd TIMES |
|   | AE | 1st TIME (START FROM TIP OF PIN) | 3rd TIMES |

What is claimed is:

1. A thread joint of a surface-sealing type used for a tube, in which a pin portion and a box portion are screwed in into each other and bound so that sealing portions come into contact with each other and shoulder portions are abut each other, comprising:

a pin portion; and a box portion, wherein the pin portion including:

a male thread formed in a tapering configuration with respect to an axis of a tube;

a sealing portion formed in a tapering configuration at a tip of the male thread; and a shoulder portion formed at a tip of the sealing portion, and the box portion including:

a female thread formed in a tapering configuration with respect to an axis of a tube;

a sealing portion formed in a tapering configuration in a back part of the female thread; and a shoulder portion formed in a back part of the sealing portion of the box portion, and wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2$ + $4.73 \times$ (Tube Outer Diameter).

2. A thread joint of a surface-sealing type used for a tube, in which a pin portion and a box portion are screwed in into each other and bound so that sealing portions come into contact with each other and shoulder portions are abut each other, comprising:

a pin portion; and a box portion, wherein the pin portion including:

a male thread formed in a tapering configuration with respect to an axis of a tube;

a sealing portion which is formed in a tapering configuration at a tip of the male thread, and is longer than a sealing portion of the box portion; and a shoulder portion formed at a tip of the sealing portion of the pin portion, and the box portion including:

a female thread formed in a tapering configuration with respect to an axis of a tube;

a sealing portion formed in a tapering configuration in a back part of the female thread; and a shoulder portion formed in a back part of the sealing portion, wherein a length $L_B$ of the sealing portion of the box portion is determined so that the sealing portions start coming into contact with each other in a circumferential direction in a state in which a tip portion of the sealing portion of the pin portion is inserted into the sealing portion of the box portion, and wherein a sliding distance $L_S$ which expresses a quantity of spiral sliding of the sealing portions relative to each other during a tightening period from the start of a contact between the sealing portions in the circumferential direction until the shoulder portions abut each other satisfies the following relationship:

Sliding Distance $L_S \leq -0.0093 \times$ (Tube Outer Diameter)$^2$ + $4.73 \times$ (Tube Outer Diameter).

3. A thread joint for a tube according to claim 2, further comprising a circumferential groove between the female thread and the sealing portion of the box portion, the circumferential groove having a width that is 1.5 to 2 times the thread pitch.

4. A thread joint of a surface-sealing type used for a tube, in which a pin portion and a box portion are screwed in into each other and bound so that sealing portions come into contact with each other and shoulder portions are abut each other, comprising:

a pin portion; and a box portion, wherein the pin portion including:

a male thread formed in a tapering configuration with respect to an axis of a tube;

a sealing portion which is formed in a tapering configuration at a tip of the male thread, and is inclined at ⅙ or larger which is steeper than the taper of the male thread;

a precedent-stage unthread portion which is disposed between the male thread and the sealing portion of the pin portion, the precedent-stage unthread portion having an inclination that is smaller than that of the sealing portion; and a shoulder portion formed at a tip of the sealing portion, and the box portion including:

a female thread formed in a tapering configuration with respect to an axis of a tube;

a sealing portion which is formed in a tapering configuration in a back part of the female thread, is longer than the sealing portion of the pin portion, and is inclined at 1/6 or larger which is steeper than the taper of the female thread; and a shoulder portion formed in a back part of the sealing portion of the box portion.

5. A thread joint of a surface-sealing type used for a tube, in which a pin portion and a box portion are screwed in into each other and bound so that sealing portions come into contact with each other and shoulder portions abut each other, comprising:

a pin portion; and a box portion, wherein the pin portion including:

a male thread formed in a tapering configuration with respect to an axis of a tube;

a sealing portion formed in a tapering configuration at a tip of the male thread;

a precedent-stage unthread portion which is disposed between the male thread and the sealing portion of the pin portion, the precedent-stage unthread portion having an inclination that is smaller than that of the sealing portion of the pin portion; and a shoulder portion formed at a tip of the sealing portion, and the box portion including:

a female thread formed in a tapering configuration with respect to an axis of a tube;

a sealing portion formed in a tapering configuration in a back part of the female thread; and a shoulder portion formed in a back part of the sealing portion of the box portion, and wherein the precedent-stage unthread portion and the sealing portion of the pin portion are connected to each other by a curve tangent to the sealing portion, the curve being either a single arc or a plurality of arcs, when the curve includes a plurality of arcs, a distance $L_a$ from a contact point X between the sealing portion and the curve to an end point Z of the arc tangent to the sealing portion is 1.45 mm or larger, and when the curve is a single arc, a distance $L_b$ from the contact point X to a boundary Y between the precedent-stage unthread portion and the sealing portion is 1.45 mm or larger.

6. A thread joint of a surface-sealing type used for a tube, in which a pin portion and a box portion are screwed in into each other and bound so that sealing portions come into contact with each other and shoulder portions abut each other, comprising:

a pin portion; and a box portion, wherein the pin portion including:

a male thread formed in a tapering configuration with respect to an axis of a tube;

a sealing portion formed in a tapering configuration at a tip of the male thread;

a precedent-stage unthread portion which is disposed between the male thread and the sealing portion of the pin portion, the precedent-stage unthread portion having an inclination that is smaller than that of the sealing portion of the pin portion; and a shoulder portion formed at a tip of the sealing portion, and the box portion including:

a female thread formed in a tapering configuration with respect to an axis of a tube;

a sealing portion formed in a tapering configuration in a back part of the female thread; and a shoulder portion formed in a back part of the sealing portion.

and wherein a curve which is tangent to the sealing portion of the point portion and connects the precedent-stage unthread portion and the sealing portion, contacts the sealing portion of the box portion with a distance of 1.45 mm or larger.

7. A thread joint for a tube according to claim 4, wherein the precedent-stage unthread portion and the sealing portion of the pin portion are connected to each other by a curve tangent to the sealing portion, the curve being either a single arc or a plurality of arcs, when the curve includes a plurality of arcs, a distance $L_a$ from a contact point X between the sealing portion and the curve to an end point Z of the arc tangent to the sealing portion is 1.45 mm or larger, and when the curve is a single arc, a distance $L_b$ from the contact point X to a boundary Y between the precedent-stage unthread portion and the sealing portion is 1.45 mm or larger.

8. A thread joint for a tube according to claim 4, wherein a curve which is tangent to the sealing portion of the pin portion and connects the precedent-stage unthread portion and the sealing portion, contacts the sealing portion of the box portion with a distance of 1.45 mm or larger.

9. A thread joint for a tube according to claim 4, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2$+ 4.73× (Tube Outer Diameter).

10. A thread joint for a tube according to claim 5, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tuber Outer Diameter)$^2$+4.73× (Tube Outer Diameter).

11. A thread joint for a tube according to claim 6, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2$+ 4.73× (Tube Outer Diameter).

12. A thread joint for a tube according to claim 7, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2$+ 4.73× (Tube Outer Diameter).

13. A thread joint for a tube according to claim 8, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

14. A thread joint of a surface-sealing type used for a tube, in which a pin portion and a box portion are screwed in into each other and bound so that sealing portions come into contact with each other and shoulder portions abut each other, comprising:

a pin portion; and a box portion, wherein the pin portion including:

a male thread formed in a tapering configuration with respect to an axis of a tube;

a sealing portion formed in a tapering configuration at a tip of the male thread; and a shoulder portion formed at a tip of the sealing portion, and the box portion including:

a female thread formed in a tapering configuration with respect to an axis of a tube;

a sealing portion which is formed in a tapering configuration in a back part of the female thread and is shorter than the sealing portion of the pin portion;

a seal guiding portion which is formed between the female thread and sealing portion of the box portion, the seal guiding portion having an inclination that is larger than that of the sealing portion; and a shoulder portion formed in a back part of the sealing portion of the box portion, and wherein a curve which is tangent to the sealing portion of the box portion and connects the seal guiding portion and sealing portion, contacts the sealing portion of the pin portion with a distance of 1.45 mm or larger.

15. A thread joint for a tube according to claim 14, wherein the sealing portions of the pin and box portions are inclined at ⅙ or larger which is steeper than the taper of the threads.

16. A thread joint for a tube according to claim 14, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

17. A thread joint for a tube according to claim 15, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

18. A box portion used in a thread joint of a surface-sealing type for a tube, into which a pin portion including a male thread, a sealing portion and a shoulder portion is screwed, comprising:

a female thread formed in a tapering configuration with respect to an axis of a tube;

a sealing portion formed in a tapering configuration in a back part of the female thread; and a shoulder portion formed in a back part of the sealing portion, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

19. A box portion used in a thread joint of a surface-sealing type for a tube, into which a pin portion including a male thread, a sealing portion and a shoulder portion is screwed, comprising:

a female thread formed in a tapering configuration with respect to the axis of the tube;

a sealing portion which is formed in a tapering configuration in a back part of the female thread; and a shoulder portion formed in a back part of the sealing portion of the box portion, wherein a length $L_S$ of the sealing portion of the box portion is determined so that the sealing portions start coming into contact with each other in a circumferential direction in a state in which a tip portion of the sealing portion of the pin portion is inserted into the sealing portion of the box portion, and wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

20. A box portion according to claim 19, further comprising a circumferential groove between the female thread of the box portion and the sealing portion of the box portion, the circumferential groove having a width that is 1.5 to 2 times the thread pitch.

21. A box portion used in a thread joint of a surface-sealing type for a tube, into which a pin portion including a male thread, a sealing portion and a shoulder portion is screwed, comprising:

a female thread which is formed in a tapering configuration with respect to an axis of a tube;

a sealing portion which is formed in a tapering configuration in a back part of the female thread, and is inclined at ⅙ or larger which is steeper than the taper of the female thread; and a shoulder portion formed in a back part of the sealing portion of the box portion.

22. A box portion according to claim 21, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

23. A box portion used in a thread joint of a surface-sealing type for a tube, into which a pin portion including a male thread, a sealing portion and a shoulder portion is screwed, comprising:

a female thread formed in a tapering configuration with respect to an axis of a tube;

a sealing portion which is formed in a tapering configuration in a back part of the female thread;

a seal guiding portion which is formed between the female thread and sealing portion of the box portion, the sealing guiding portion having an inclination that is larger than that of the sealing portion; and a shoulder portion formed in a back part of the sealing portion of the box portion, and wherein a curve which is tangent to the sealing portion of the box portion and connects the seal guiding portion and the sealing portion, contacts the sealing portion of the pin portion with a distance of 1.45 mm or larger.

24. A box portion according to claim 23, wherein the sealing portion is inclined at ⅙ or larger which is steeper than the taper of the female thread.

25. A box portion according to claim 23, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2$ + 4.73× (Tube Outer Diameter).

26. A box portion according to claim 24, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2$ + 4.73× (Tube Outer Diameter).

27. A pin portion used in a thread joint of a surface-sealing type for a tube which is inserted into a box portion including a female thread, a sealing portion and a shoulder portion, comprising:

a male thread formed in a tapering configuration with respect to an axis of a tube;

a sealing portion formed in a tapering configuration at a tip of the male thread; and a shoulder portion formed at a tip of the sealing portion, wherein a sliding distance $L_S$ which expresses a quantity of spiral sliding of the sealing portions relative to each other during a tightening period from the start of a contact between the sealing portions until the shoulder portions abut each other in a circumferential direction satisfies the following relationship:

Sliding Distance $L_S \leq -0.0093 \times$ (Tube Outer Diameter)$^2$ + 4.73× (Tube Outer Diameter.

28. A pin portion used in a thread joint of a surface-sealing type for a tube in combination with a box portion into which the pin portion is inserted, the box portion including a female thread, a sealing portion and a shoulder portion, the pin portion comprising:

a male thread formed in a tapering configuration with respect to an axis of a tube;

a sealing portion which is formed in a tapering configuration at a tip of the male thread, and is longer than the sealing portion of the box portion; and a shoulder portion formed at a tip of the sealing portion of the pin portion, wherein a sliding distance $L_S$ which expresses a quantity of spiral sliding of the sealing portions relative to each other during a tightening period from the start of a contact between the sealing portions in a circumferential until the shoulder portions abut each other satisfies the following relationship:

Sliding Distance $L_S \leq -0.0093 \times$ (Tube Outer Diameter)$^2$ + 4.73× (tube Outer Diameter).

29. A pin portion used in a thread joint of a surface-sealing type for a tube which is inserted into a box portion including a female thread, a sealing portion and a shoulder portion, comprising:

a male thread formed in a tapering configuration with respect to an axis of a tube;

a sealing portion which is formed in a tapering configuration at a tip of the male thread, and is inclined at ⅙ or larger which is steeper than the taper of the male thread;

a precedent-stage unthread portion which is disposed between the male thread and the sealing portion, the precedent-stage unthread portion having an inclination that is smaller than that of the sealing portion; and a shoulder portion which is formed at a tip of the sealing portion.

30. A pin portion used in a thread joint of a surface-sealing type for a tube which is inserted into a box portion including a female thread, a sealing portion and a shoulder portion, comprising:

a male thread formed in a tapering configuration with respect to an axis of a tube;

a sealing portion formed in a tapering configuration in a back part of the male thread;

a precedent-stage unthread portion which is disposed between the male thread and the sealing portion, the precedent-stage unthread portion having an inclination that is smaller than that of the sealing portion; and a shoulder portion formed in a back part of the sealing portion, wherein the precedent-stage unthread portion and the sealing portion are connected to each other by a curve tangent to the sealing portion, the curve being either a single arc or a plurality of arcs, when the curve includes a plurality of arcs, a distance $L_a$ from a contact point X between the sealing portion and the curve to an end point Z of the arc tangent to the sealing portion is 1.45 mm or larger, and when the curve is a single arc, a distance $L_b$ from the contact point X to a boundary Y between the precedent-stage unthread portion and the sealing portion is 1.45 mm or larger.

31. A pin portion used in a thread joint of a surface-sealing type for a tube which is inserted into a box portion including a female thread, a sealing portion and a shoulder portion, comprising:

a male thread formed in a tapering configuration with respect to the axis of the tube;

a sealing portion formed in a tapering configuration in a back part of the male thread;

a precedent-stage unthread portion which is disposed between the male thread and the sealing portion, the precedent-stage unthread portion having an inclination that is smaller than that of the sealing portion; and a shoulder portion formed in a back part of the sealing portion, wherein a curve which is tangent to the sealing portion and connects the precedent-stage unthread portion and the sealing portion, contacts the sealing portion of the box portion with a distance of 1.45 mm or larger.

32. A pin portion according to claim 29, wherein the precedent-stage unthread portion and the sealing portion are connected to each other by a curve tangent to the sealing portion, the curve being either a single arc or a plurality of arcs, when the curve includes a plurality of arcs, a distance $L_a$ from a contact point X between the sealing portion and the curve to an end point Z of the arc tangent to the sealing portion is 1.45 mm or larger, and when the curve is a single arc, a distance $L_b$ from the contact point X to a boundary Y between the precedent-stage unthread portion and the sealing portion is 1.45 mm or larger.

33. A pin portion according to claim 29, wherein a curve which is tangent to the sealing portion and connects the precedent-stage unthread portion and the sealing portion, contacts the sealing portion of the box portion with a distance of 1.45 mm or larger.

34. A pin portion according to claim 29, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

35. A pin portion according to claim 30, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

36. A pin portion according to claim 31, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

37. A pin portion according to claim 32, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

38. A pin portion according to claim 33, wherein a sliding distance $L_S$ which expresses a quantity of spiral sliding of the sealing portions relative to each other during a tightening period from the start of a contact between the sealing portions in a circumferential direction until the shoulder portions abut each other satisfies the following relationship:

Sliding Distance $L_S \leq -0.0093 \times$ (Tube Outer Diameter)$^2 +$ 4.73× (Tube Outer Diameter).

* * * * *